(12) United States Patent
Aizenberg et al.

(10) Patent No.: US 6,891,682 B2
(45) Date of Patent: May 10, 2005

(54) LENSES WITH TUNABLE LIQUID OPTICAL ELEMENTS

(75) Inventors: Joanna Aizenberg, New Providence, NJ (US); Timofei Nikita Kroupenkine, Warren, NJ (US); Stanley Pau, Hoboken, NJ (US); Shu Yang, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 63 days.

(21) Appl. No.: 10/378,412

(22) Filed: Mar. 3, 2003

(65) Prior Publication Data

US 2004/0174610 A1 Sep. 9, 2004

(51) Int. Cl.$^7$ .............................. G02B 9/00; G02B 3/12; G03B 7/00

(52) U.S. Cl. ......................... 359/738; 359/665; 396/64

(58) Field of Search ................................. 359/665, 666, 359/738, 740; 396/64

(56) References Cited

U.S. PATENT DOCUMENTS

| 3,454,686 A | 7/1969 | Jones ........................ 264/1.36 |
| 3,670,130 A | 6/1972 | Greenwood ................... 200/183 |
| 4,030,813 A | 6/1977 | Kohashi et al. ............. 359/245 |
| 4,118,270 A | 10/1978 | Pan et al. ...................... 216/24 |
| 4,137,060 A | 1/1979 | Timmermann .................. 65/31 |
| 4,338,352 A | 7/1982 | Bear et al. ....................... 427/8 |
| 4,406,732 A | 9/1983 | Kayoun ........................ 216/85 |
| 4,569,575 A | 2/1986 | Le Pesant et al. .......... 359/245 |
| 4,653,847 A | 3/1987 | Berg et al. ..................... 385/79 |
| 4,671,609 A | 6/1987 | Khoe et al. ..................... 385/33 |
| 4,708,426 A | 11/1987 | Khoe ........................... 385/43 |
| 4,783,155 A | * 11/1988 | Imataki et al. .............. 359/666 |
| 4,784,479 A | * 11/1988 | Ikemori ....................... 359/666 |
| 4,867,521 A | 9/1989 | Mallinson .................... 365/34 |
| 4,948,214 A | 8/1990 | Hamblen ..................... 359/654 |
| 5,248,734 A | 9/1993 | Ober et al. .............. 525/328.8 |
| 5,348,687 A | 9/1994 | Beck et al. ................... 252/582 |
| 5,412,746 A | 5/1995 | Rossberg et al. ............. 385/48 |
| 5,428,711 A | 6/1995 | Akiyama et al. .............. 706/40 |
| 5,486,337 A | 1/1996 | Ohkawa ...................... 422/100 |
| 5,518,863 A | 5/1996 | Pawluczyk .................. 430/321 |
| 5,659,330 A | 8/1997 | Sheridon ...................... 345/84 |
| 5,665,527 A | 9/1997 | Allen et al. .................. 430/325 |
| 5,922,299 A | 7/1999 | Bruinsma et al. ........... 423/335 |
| 5,948,470 A | 9/1999 | Harrison et al. ............ 427/198 |
| 6,014,259 A | 1/2000 | Wohlstadter ................ 359/619 |
| 6,027,666 A | 2/2000 | Ozin et al. ............. 252/301.4 R |
| 6,319,427 B1 | 11/2001 | Ozin et al. ............ 252/301.4 F |
| 6,329,070 B1 | 12/2001 | Sass et al. ................... 428/612 |

(Continued)

FOREIGN PATENT DOCUMENTS

| DE | 196 23 270 A | 1/1998 | .......... G02B/26/09 |
| FR | 2 769 375 A1 | 4/1999 | .......... G02B/3/14 |
| WO | WO 99/18456 | 4/1999 | .......... G02B/26/02 |
| WO | WO 01/31404 A1 | 5/2001 | .......... G03F/7/30 |
| WO | WO 01/42540 A1 | 6/2001 | .......... C30B/33/00 |
| WO | WO 01/51990 A1 | 7/2001 | .......... G03C/5/00 |

OTHER PUBLICATIONS

U.S. Appl. No. 10/321,027, filed Dec. 17, 2002, Reichmanis et al.

(Continued)

*Primary Examiner*—Georgia Epps
*Assistant Examiner*—William Choi
(74) *Attorney, Agent, or Firm*—John F. McCabe

(57) ABSTRACT

A tunable optical lens includes a solid refractive optical lens, a channel adjacent to the solid refractive optical lens, and an extended body of liquid. A portion of the body forms at least part of an aperture stop for the lens. The portion of the body forms a meniscus that protrudes from or into the channel. The liquid is light-absorbing in the visual spectrum and/or in the near-infrared spectrum.

20 Claims, 6 Drawing Sheets

U.S. PATENT DOCUMENTS

| | | | |
|---|---|---|---|
| 6,369,954 B1 | 4/2002 | Berge et al. | 359/666 |
| 6,379,874 B1 | 4/2002 | Ober et al. | 430/322 |
| 6,387,453 B1 | 5/2002 | Brinker et al. | 427/387 |
| 6,409,907 B1 | 6/2002 | Braun et al. | 205/317 |
| 6,465,387 B1 | 10/2002 | Pinnavaia et al. | 502/158 |
| 6,471,761 B2 | 10/2002 | Fan et al. | 106/287.16 |
| 6,473,543 B2 * | 10/2002 | Bartels | 385/16 |
| 6,538,823 B2 | 3/2003 | Kroupenkine et al. | 359/665 |
| 6,545,815 B2 | 4/2003 | Kroupenkine et al. | 359/665 |
| 6,545,816 B1 | 4/2003 | Kroupenkine et al. | 359/665 |

OTHER PUBLICATIONS

U.S. Appl. No. 10/098,286, filed Mar. 15, 2002, Chen et al.

U.S. Appl. No. 10/040,017, filed Jan. 4, 2002, Megens et al.

U.S. Appl. No. 10/383,150, filed Mar. 6, 2003, Chen et al.

U.S. Appl. No. 10/231,614, filed Aug. 30, 2002, Kroupenkine et al.

U.S. Appl. No. 10/139,124, filed May 3, 2002, Kroupenkine et al.

U.S. Appl. No. 10/135,973, filed Apr. 30, 2002, Bao et al.

U.S. Appl. No. 10/637,837, filed Aug. 8, 2003, Davis et al.

U.S. Appl. No. 10/402,046, filed Mar. 28, 2003, Aizenberg et al.

U.S. Appl. No. 10/631,996, filed Jul. 31, 2003, Aizenberg et al.

U.S. Appl. No. 10/094,093, filed Mar. 8, 2002, Eggleton et al.

U.S. Appl. No. 10/096,199, filed Mar. 12, 2002, Chandross et al.

Washizu, Masao, "Electrostatic Actuation of Liquid Droplets for Microreactor Applications," *IEEE Transactions on Industry Applications*, vol. 34, No. 4, Jul./Aug. 1998, pp. 732–737.

Schilling, Andreas et al., Surface Profiles of Reflow Microlenses Under the Influence of Surface Tension and Gravity, *Opt. Eng.* (39(8) pp. 2171–2176, Society of Photo–Optical Instrumentation Engineers, Aug. 2000.

Danzerbrink, R. et al., "Deposition of Micropatterned Coating Using an Ink–Jet Technique," *Thin Solid Films* 351, pp. 115–118, Elsevier Science S.A. (1999).

Feng, Chuan Liang et al., "Reversible Wettability of Photoresponsive Flourine–Containing Azobenzene Polymer in Langmuir–Blodgett Films," *Lengmuir* vol. 17, No. 15, 2001, pp. 4593–4597, American Chemical Society, published on Web Jun. 22, 2001.

Ichimura, Kunihiro et al., "Light–Driven Motion of Liquids on a Photoresponsive Surface," Science, vol. 288, Jun. 2, 2000, pp. 1624–1626.

Commander, L.G. et al., "Variable Focal Length Microlenses," *Optics Communications* 177, Apr. 15, 2000, pp. 157–170.

Aizenberg, J., et al., "Calcitic microlenses as part of the photoreceptor system in brittlestars," *Nature*, vol. 412, pp. 819–822, Aug. 23, 2001.

English language translation of abstract for German Patent Document: DE 19623270 from European Patent Office database, esp@cenet.com, (1998), 1 page.

Tuberfield, A.J., "*Photonic Crystals Made By Holographic Lithography*," MRS. Bulletin, Aug. 2001, pp. 692–636.

Campbell, M., et al., "*Fabrication of Photonic Crystals For The Visible Spectrum by Holographic Lithography*," Nature, vol. 404, Mar. 2, 2000, pp. 53–56.

Ho, K.M., et al., "*Existence Of A Photonic Gap In Periodic Dielectric Structures*," Physical Review Letters, vol. 65, No. 25, Dec. 17, 1990, pp. 3152–3155.

Ozbay, E., et al., "*Measurement Of A Three–Dimensional Photonic Band Gap In A Crystal Structure Made Of Dielectric Rods*," Physical Review B, vol. 50, No. 3, Jul. 15, 1994, pp. 1945–1948.

Tuberfield, A., "*Photonic Crystals Made By Holographic Lithography,*" ABSTRACT from Symposium K, Micropho-tonics–Materials, Phyisics, and Applications, Nov. 26–29, 2001, 1 page.

Shoji, S., et al., "*Photofabrication Of Three–Dimensional Photonic Crystals By Multibeam Laser Interference Into A Photopolymarizable Resin*," Applied Physics Letters, vol. 76, No. 19, May 8, 2000, pp. 2668–2670.

Sundararajan, N., et al., "*Supercritical $CO_2$ Processing for Submicron Imaging of Fluoropolymers*," Chemistry of Materials, vol. 12, No. 1, Jan. 2000, pp. 41–48.

Kresge, C.T., et al: "*Ordered mesoporous molecular sievas synthesized by a liquid–crystal template mechanism*" NATURE, vol. 359, Oct., 1992, pp. 710–712.

Tanev, Peter T., et al: "*A Neutral Templating Route to Mesaporous Molecular Sieves*," SCIENCE, vol. 267, Feb., 1995, pp. 855–867.

Huo, Q. et al: "*Generalized synthesis of periodic surfactant/ inorganic composite materials*," NATURE, vol. 368, Mar., 1994, pp. 317–321.

Sanchez, C., et al: "*Design and Properties of Hybrid Organic–Inorganic Nanocomposites for Photonics*," MRS Bulletin, May, 2001, pp. 377–387.

Yang, P., et al: "*Hierarchically Ordered Oxides*," Science, vol. 282, Dec. 1998, pp. 2244–2246.

Templin, M. et al: "*Organically Modified Aluminosilicate Mesostructures from Block Copolymer Phases*," Science, vol. 278, Dec., 1997, pp. 1795–1798.

Raman, N.K., et al: "*Template–Based Approaches to the Preparation of Amorphous, Nanoporous Silicas*," Chemical Matter, vol. 8, Feb., 1996, pp. 1682–1701.

Yang, P., et al: "*Block Copolymer Templating Synthesis of Mesoporous Metal Oxides with Large Ordering Lengths and Semicrystalline Framework*," Chemical Matter, vol. 11, 1999, pp. 2813–2826.

Brinker, C.J., et al., "*Evaporation–Induced Self–Assembly: Nanostructures Made Easy*\*\*" Advanced Materials, vol. 11, 1999, pp. 579–585.

Lee, Y–J., Braun, P.V., "*Tunable Inverse Opal Hydrogel pH Sensors*," Adv. Mater. 2003, 15, No. 7–8, Apr. 17, 2003, pp. 563–566.

Arsenault, A.C., et al., "*A Polychromic, Fast Response Metallopolymer Gel Photonic Crystal with Solvant and Redox Tunability: A Step Towards Photonic Ink (P–Ink)*," Adv. Mater. 2003, 15, No. 6, Mar. 17, 2003, pp. 503–507.

Zhang, S., et al., "*Materials and techniques for electro-chemical biosensor design and construction*," Biosensors & Bioelectronics 15, (2000), pp. 273–282.

Wu, H., et al., "*Reduction Photolithography Using Microlens Arrays: Applications in Gray Scale Photolithography*," Analytical Chemistry, vol. 74, No. 14, Jul. 15, 2002, pp. 3267–3273.

Leister Microsystems, leaflet by Leister Microsystems entitled, "*Micro–optics—Imagine the Future of Light*," Sep. 2000, 4 pages.

Stokes, D.L., et al., "*Detection of E. coli using a microfluidics–based Antibody Biochip detection systems,*" Fresenius, J. Anal Chem (2001) 369, pp. 295–301.

Jahns, J., et al., "*Microoptics for biomedical applications,*" American Biotechnology Laboratory, No. 18, Oct., 2000, pp. 52 and 54.

Campbell, D.J., et al., "*Replication and Compression of Bulk and Surface Structures with Pholydimethylsiloxane Elastomer,*" Journal of Chemical Education, vol. 75, No. 4, Apr. 1999, pp. 537–541.

Kruk, M., et al., "*Mesoporous Silicate–Surfactant Composites with Hydrophobic Surfaces and Tailored Pore Sizes*"; Journal of Physical Chemistry 106 B (2002) pp. 10096–10101.

Thrush, E., et al., "*Integrated semiconductor fluorescent detection system for biochip and biomedical applications,*" IEEE–EMBS Special Topic Conference on Microtechnologies in Medicine & Biology, May 2002, pp. 374–379.

Avgeropoulos, et al., "*Synthesis and Morphological Behavior of Silicon–Containing Triblock Copolymers for Nanostructure Applications,*" Chem. Mater. 1998, 10, pp. 2109–2115.

Chan, Vanessa A–H., et al., "*Ordered Bicontinuous Nanoporous and Nanorelief Ceramic Films from Self–Assembling Polymer Precursors,*" Science, Nov. 26, 1999, vol. 286, pp. 1716–1719.

Shishido, A., et al., "*Direct fabrication of two–dimensional titania arrays using interference photolithography,*" Applied Phyiscal Letters, vol. 79, No. 20, Nov. 12, 2001, pp. 3332–3334.

Young, "*Organic–Inorganic Monomers,*" accessed at http://www.psrc.unm.edu/mauritz/nano2.html, Jul. 8, 2002.

Yang, et al., "*Creating Periodic Three–Dimensional Structures by Multibeam Interference of Visible Laser,*" Chemistry of Materials, vol. 14, No. 7, Jul. 2002, pp. 2831–2833.

Vlasov et al., "*On–Chip Netural Assembly of Silicon Photonic Bandgap Crystals,*" Nature, vol. 414, Nov. 15, 2001, pp. 289–293.

Baney, et al., "*Silsesquioxanes,*" American Chemical Society, 1995, pp. 1409–1430.

The Wittman Company, "*Carbon Dioxide,*" published online at http://www.witteman.com/co2.htm, Dec. 4, 2002, 2 pages.

"*Sol–Gel Chemistry,*" published online at http://.sol-gel.com/chemi.htm, Dec. 9, 2002, 2 pages.

Abbot, N.L., et al., "*Potential–Dependent Wetting of Aqueous Solutions on Self–Assembled Monolayers Formed from 15–(Ferrocenylcarbonyl) pentadecanethiol on Gold,*" Langmuir 1994, American Chemical Society, vol. 10, pp. 1493–1497.

\* cited by examiner

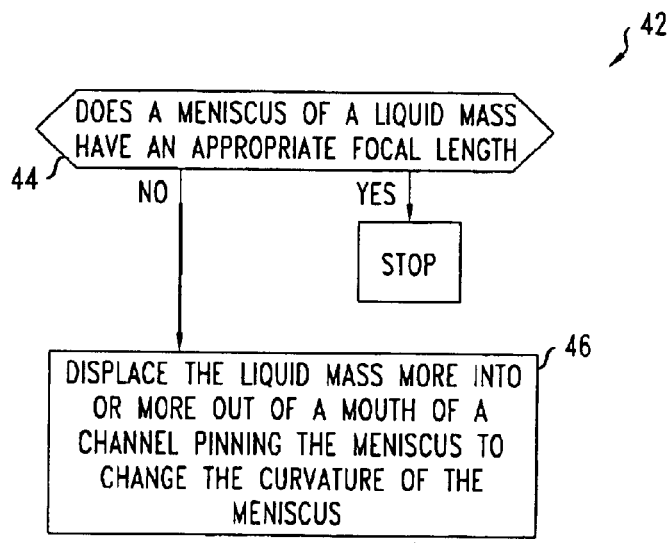
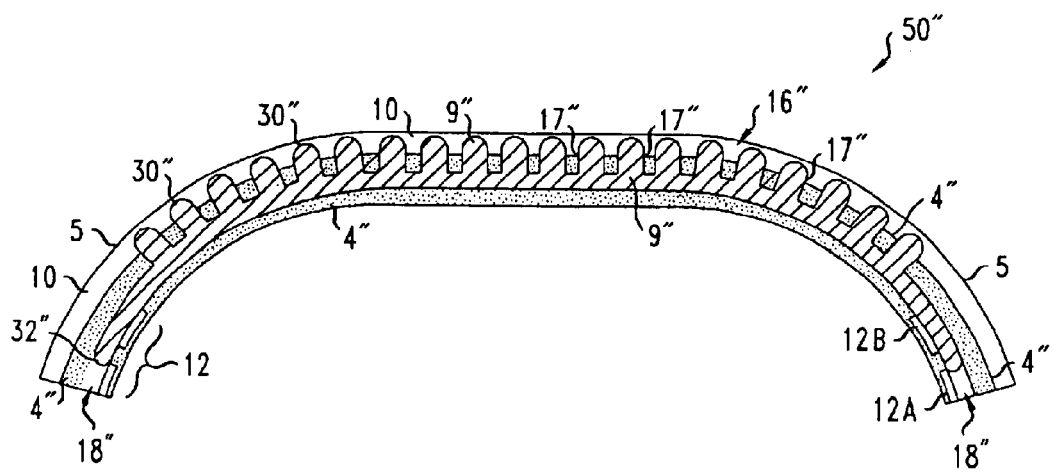

LENSES WITH TUNABLE LIQUID OPTICAL ELEMENTS

BACKGROUND

1. Field of the Invention

The invention relates to tunable lenses and lens arrays.

2. Discussion of the Related Art

In conventional optical imaging, it is often necessary to tune one or more characteristics of an optical lens. In particular, it is often necessary to tune a focal length of a lens so that the lens forms a clear image of a distant object. It is also often necessary to tune an aperture of a lens so that bright or dim lighting conditions do not cause too much or too little light to be transmitted by the lens.

In conventional man-made lenses, the tuning of lens characteristics typically relies on movable rigid elements. The rigid elements include rigid structures for moving lenses and rigid structures for opening and closing apertures. These rigid elements are often difficult or expensive to fabricate for micro-lenses. These rigid elements also often require complex controllers in lens arrays. In micro-lenses and lens arrays, other methods for tuning lens characteristics are desirable.

SUMMARY

Various embodiments provide optical lenses in which tunable optical elements include extended bodies of liquids that protrude from or into channels. Examples of such tunable optical elements include liquid aperture stops and liquid lenses.

In a first aspect, the invention features a tunable optical lens that includes a solid refractive optical lens, a channel adjacent to the solid refractive optical lens, and an extended body of liquid. A portion of the body forms at least part of an aperture stop for the solid refractive optical lens. The portion of the body forms a meniscus that protrudes from or into the channel. The liquid is light-absorbing in the visual spectrum and/or in the near-infrared spectrum.

In a second aspect, the invention features a tunable optical lens that includes a housing and an extended body of a first liquid, which is located in the housing. The housing has a channel with a mouth. A portion of the body has a meniscus that protrudes from or into the mouth. The meniscus is pinned at the mouth. The apparatus includes a second liquid in contact with the extended body's meniscus and a device capable of displacing the extended body. The first and second liquids are immiscible, have different refractive indexes, and are transparent in the visual spectrum.

In a third aspect, the invention features a method for tuning a lens. The method includes deciding whether a characteristic of the lens has an appropriate value and deforming a meniscus of a liquid body to compensate the characteristic in response to deciding that the characteristic has an inappropriate value. The meniscus bulges from or into a channel and forms either the lens or an aperture stop for the lens. The characteristic is either a focal length of the lens or a size of an optical aperture of the lens.

BRIEF DESCRIPTION OF THE FIGURES

FIG. 6 is a flow chart for a method of tuning an optical lens similar to the lens of FIGS. 5A–5B;

FIG. 7 is a cross-sectional view of a lens array that incorporates tunable optical lenses similar to the lens of FIGS. 5A–5B.

In the Figures and text, like reference numbers refer to functionally similar elements.

DESCRIPTION OF ILLUSTRATIVE EMBODIMENTS

Some biological organisms tune lens characteristics without using movable rigid elements. In particular, the brittlestar has an array of micro-lenses with tunable transmissivities. The brittlestar tunes the transmissivities of the micro-lenses to compensate for changing lighting conditions. During daytime, the brittlestar sets the transmissivities of the micro-lenses to be lower than during nighttime. The brittlestar has cellular structures that perform the transmissivity tuning. The cellular structures distribute pigments in front of the micro-lenses during the daytime and distribute the pigments lateral to the micro-lenses during the nighttime.

Various embodiments of optical lenses have tunable liquid optical elements. The liquid optical elements are formed by portions of extended liquid bodies that protrude from or protrude into channels. The liquid optical elements provide tunable transmissivities and/or focal lengths for these optical lenses.

Figure 1A:
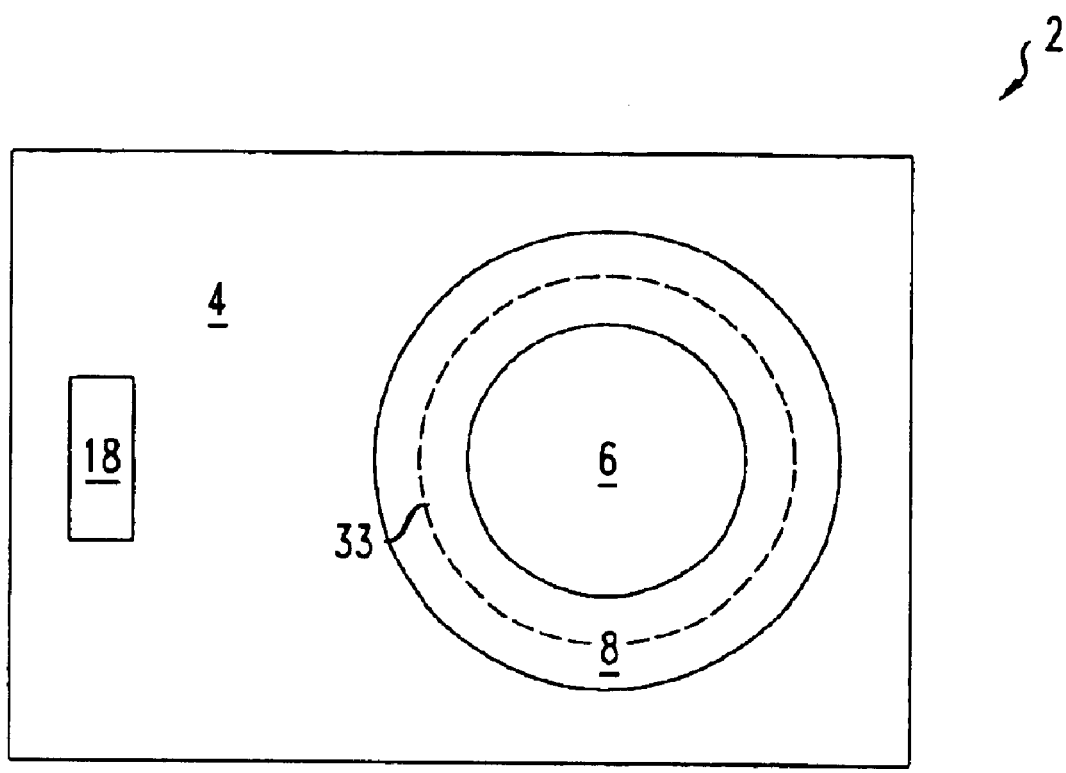
FIG. 1A is a top view of an optical lens with a tunable liquid aperture stop.
Figure 1B:
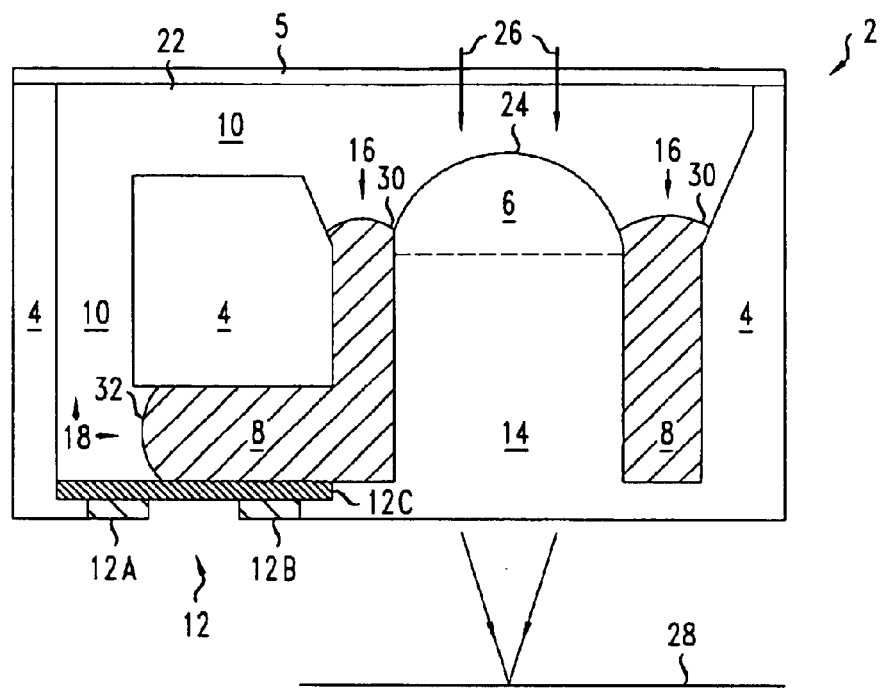
FIG. 1B is a cross-sectional view of the tunable optical lens of FIG. 1A for one aperture opening.
Figure 1C:
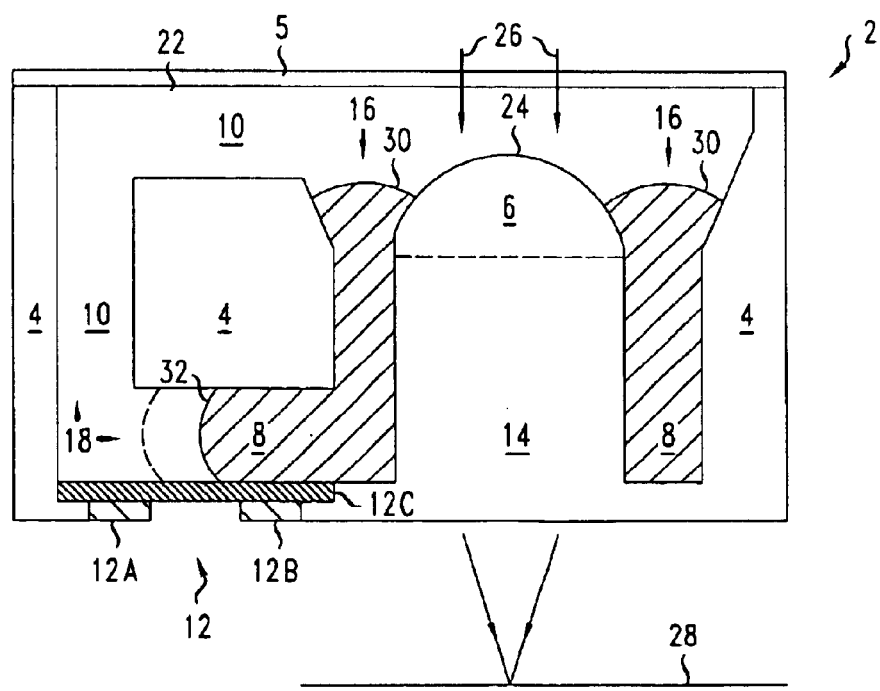
FIG. 1C is a cross-sectional view of the tunable optical lens of FIG. 1A for a narrower aperture opening.

FIGS. 1A–1C show an optical lens 2 whose transmissivity is tunable due to a liquid optical element. The optical lens 2 includes a housing 4, a cover layer 5, a refractive optical lens 6, an extended body 8 of light-absorbing liquid, a confining liquid 10, and a device 12 for controlling the position of the liquid body.

The housing 4 is a transparent structure that includes a circularly cylindrical pedestal 14 and connected channels 16 and 18. The cylindrical pedestal 14 forms a support for refractive optical lens 6. The channel 16 has an annular shape and borders both the pedestal 14 and the refractive optical lens 6. The channel 18 connects the base of the channel 16 to a cavity 22 located above the refractive optical lens 6. The channels 16 and 18 form a connected pathway in which an extended body of liquid, i.e., the body 8, can move.

The cover layer 5 closes cavity 22. The cover layer 5 and housing 4 together form a closed structure in which liquids are able to circulate and from which liquids will not evaporate.

Both the housing 4 and the cover layer 5 are transparent at the preselected operating wavelengths of the tunable lens 2, e.g., visible and/or near-infrared wavelengths. Herein, near-infrared light has a wavelength shorter than about 1.7 micrometers and longer than wavelengths for visible light.

Exemplary materials for the housing 4 and cover layer 5 include inorganic materials such as silica glass and rigid or flexible cross-linked organic polymer networks such as acrylic plastics.

The refractive lens 6 has a curved top surface 24 that refracts incident light rays 26. The refracted light rays pass through the pedestal 14 without being further refracted and are transmitted to an image detector 28. The image detector 28 is located outside of the housing 4. The refractive lens 6 may be mounted on the pedestal 14 or may be an integral part of the pedestal 14, e.g., a convex or concave shaped top end of the pedestal 14.

The light-absorbing liquid forms a single extended body that spans both channel 16 and channel 18. The liquid has a high surface tension, which causes body 8 to have a high contact angle (CA) at the surfaces of channels 16, 18. Exemplary CAs of the liquid body 8 are greater than 90° and preferably are about 110° or more. The body 8 also has a low contact angle hysteresis (CAH) on the surfaces of channels 16, 18, i.e., preferably a CAH of about 2–3° or less. The high CA and low CAH increase the mobility of the body 8 of light-absorbing liquid in the channels 16, 18. The channels 16, 18 also have hydrophobic surfaces and fluorinated surface coatings that reduce liquid body pinning on surface irregularities. Exemplary surface coatings include highly fluorinated self-assembled monolayers and fluorinated polymer layers made by conventional chemical vapor deposition or by spin or dip coating methods.

The liquid of the extended body 8 includes one or more dissolved pigments. The pigment(s) cause the body 8 to absorb light in the operating wavelength range of the tunable lens 2. The pigment(s) cause the body 8 to be opaque, semi-opaque, or selectively absorbent in a portion of the operating spectrum of the tunable lens 2. nhomogeneities of the channels 16, 18.

The confining liquid 10 has several important optical and physical properties. First, the confining liquid 10 has a different refractive index than refractive optical lens 6. For that reason, the optical lens 6 refracts incident light rays 26 even though it is in contact with the confining liquid 10. Second, the confining liquid 10 is transparent at the preselected wavelengths where the tunable lens 2 will operate. Third, the confining liquid 10 and the light-absorbing liquid of body 8 are immiscible so that interfaces 30, 32 i.e., menisci of the light-absorbing liquid, are permanently present between the two liquids. The interfaces 30, 32 are needed for the liquid body 8 to provide a tunable transmissivity to refractive optical lens 6. Fourth, the confining liquid 10 and the light-absorbing liquid of the body 8 have matching densities so that inertial shocks to housing 4 and re-orientations of the housing 4 will not displace the liquid body 8. The use of a density matched liquid to stabilize a body of a second liquid is described in U.S. patent application Ser. No. 09/95 1,637, filed Sep. 13, 01, by T. Kroupenkine et al, which is incorporated herein by reference in its entirety. Last, the confining liquid 10 preferably has a low surface energy so that the confining liquid wets and lubricates surfaces of channels 16, 18. This lubrication reduces the risk that the extended body 8 of light-absorbing liquid will be pinned at surface inhomogeneities of the channels 16, 18.

Exemplary confining liquids 8 include silicone oils. These oils are readily available from a variety of sources.

The device 12 holds and displaces the body 8 of light-absorbing liquid. The device 12 includes two metallic plates 12A, 12B, a hydrophobic dielectric layer 12C, and a DC voltage source (not shown). The plates 12A, 12B are separated by a gap and are connected across the DC voltage source. The plates 12A, 12B are adjacent to a portion of channel 18 and the second meniscus 32 of the body 8 of light-absorbing liquid. The plates 12A, 12B are insulated from liquids in the channel 18 by the dielectric layer 12C. Typically, the dielectric layer 12C also includes a fluorinated surface coating that reduces the risk of pinning of liquid bodies thereon.

In operation, the voltage across plates 12A, 12B applies an electric field across the second meniscus 32 of the extended body 8 of light-absorbing liquid, which is conductive. The electric field is capable of changing the contact angle that the second meniscus 32 makes with the surface of channel 18. Changes to the contact angle produce electro-wetting forces on the meniscus 32. Depending on its size, the electro-wetting force either holds the second meniscus 32 at a particular position or displaces the second meniscus 32 along the channel 18. Devices for producing such electro-wetting forces on liquid bodies are described in U.S. patent application Ser. No. 09/884,605, filed Jun. 19, 01, by T. Kroupenkine et al, which is incorporated herein by reference in its entirety.

For an electro-wetting force to displace the body 8, the light-absorbing liquid of the body 8 should be conductive. Exemplary conductive liquids include aqueous salt solutions and molten salts. Exemplary aqueous salt solutions include 0.01 molar solutions of salts such as LiN, LiCl, $KNO_3$, or KCl. Exemplary molten salts include 1-Ethyl-3-methylimidazolium tetrafluoroborate and 1-Ethyl-3-methylimidazolium trifluoromethanesulfonate, which are both commercially available.

In other embodiments of tunable lens 2 (not shown), the electro-wetting device 12 is replaced by a conventional mechanical pump. The pump applies a pressure to liquid in channel 18 thereby holding or displacing the body 8 of light-absorbing liquid.

FIGS. 1A–1C show how the extended body 8 of light-absorbing liquid provides a tunable transmissivity to refractive optical lens 6. The extended body 8 of light-absorbing liquid extends between channels 16 and 18. One meniscus 30 of the body 8 protrudes out of channel 16 and covers an annular portion 33 of the curved surface 24 of the refractive optical lens 6 (see FIG. 1A). The protruding portion of the body 8 of light-absorbing liquid partially or completely blocks light 26 from passing through the covered annular portion 33 of the refractive optical lens 6. Thus, the protruding portion of the body 8 functions as an aperture stop for the refractive optical lens 6. Herein, an aperture stop partially or totally blocks light incident on the stop.

Movements of the liquid body 8 in channel 16 change the size of the effective aperture stop of refractive optical lens 6. In particular, an upward motion of the body 8 in the channel 16 causes the light-absorbing liquid to cover a larger annular portion 33 of the refractive optical lens 6. As seen from FIG. 1C, this upward motion further reduces the size of the aperture for the refractive optical lens 6, i.e., lowers transmissivity through the refractive optical lens 6. A downward motion of the body 8 in the channel 16 causes the light-absorbing liquid to cover a smaller annular portion 33 of the refractive optical lens 6 thereby increasing the size of the aperture for the lens 6.

Since displacements of the body 8 of light-absorbing liquid change the size of the lens optical aperture, the body 8 of light-absorbing liquid functions as an tunable aperture stop for the refractive lens 6. The light-absorbing liquid is a total stop and a partial stop for light incident thereon in cases where the light-absorbing liquid is completely opaque and semi-opaque, respectively. In tunable lens 2, displacements of the body 8 of light-absorbing liquid rather than motions of a rigid mechanical structure changes the size of the lens optical aperture.

A displacement of the body 8 in channel 16 is controlled by a force applied to the body's second meniscus 32, which is located in channel 18. In particular, the device 12 applies a tunable electro-wetting force to the second meniscus 32 of the body 8. The electro-wetting force causes a displacement of the second meniscus 32, which displaces the whole body 8 of light-absorbing liquid, because the liquid is substantially incompressible. Thus, the electrically controlled motion of the second meniscus 32 causes the first meniscus 30 to move up or down in the channel 16 thereby changing the size of the optical aperture of the refractive optical lens 6.

Figure 2:
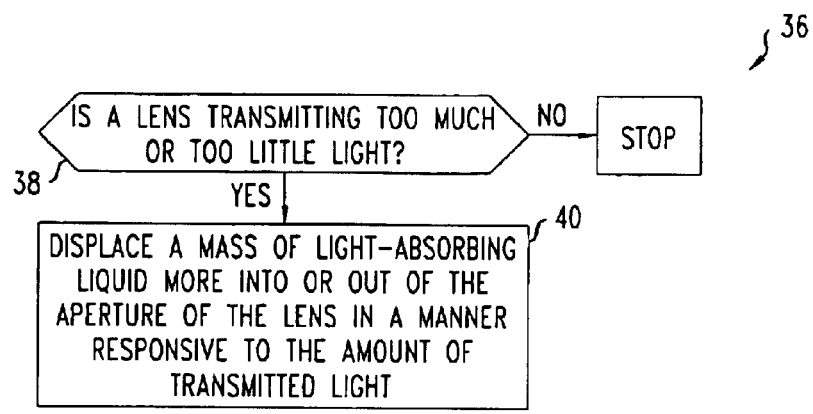
FIG. 2 is a flow chart illustrating a method of tuning a liquid aperture of a lens similar to the lens of FIGS. 1A–1C.

FIG. 2 illustrates a method 36 of operating an optical lens with a tunable liquid aperture, e.g., tunable lens 2 of FIGS. 1A–1C. The method 36 includes deciding whether a refractive optical lens is transmitting too much or too little light (step 38). The deciding step may include measuring the amount of transmitted light. Then, the actual measurement determines whether an inappropriate amount of light is being transmitted. The deciding step may instead include determining whether an external condition inherently indicates that too much or too little light is being transmitted. Exemplary external conditions include changes in external lighting levels, e.g., at sun up or sun down, and changes of the sensitivities of optical detectors illuminated by the refractive optical lens, e.g., a change of a film type. In response to deciding that the refractive optical lens is transmitting an inappropriate amount of light, the method 36 includes displacing a part of a body of light-absorbing liquid into or out of the optical aperture of the refractive optical lens to cause the lens to transmit a more appropriate amount of light (step 40). In response to too much light transmission, the displacing step will cause the body of light-absorbing liquid to block more of the optical aperture of the refractive optical lens than was previously blocked. In response to too little light transmission, the displacing step will cause the body of light-absorbing liquid to block less of the optical aperture of the refractive optical lens than was previously blocked.

In method 36, decreasing the aperture size also decreases the depth of focus of the imaging condition.

Figure 3:
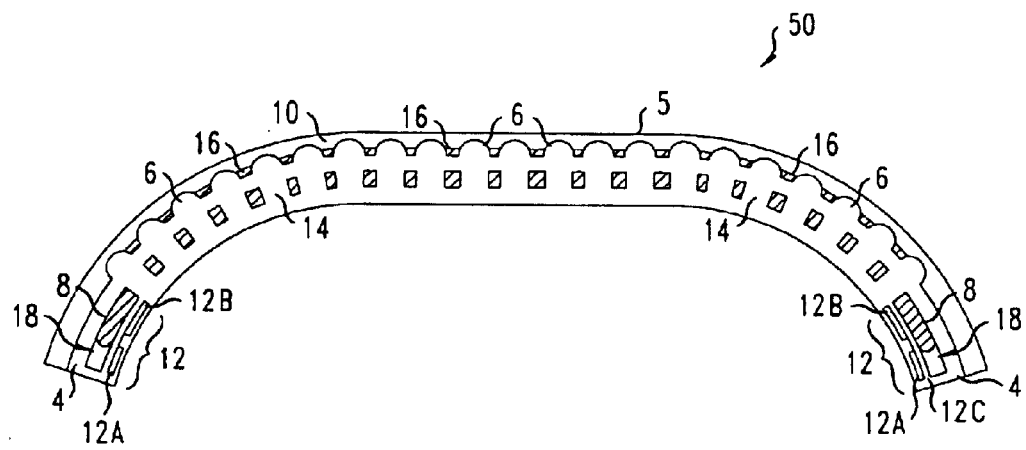
FIG. 3 is a cross-sectional view through a lens array that incorporates tunable lenses similar to the lens of FIGS. 1A–1C.
Figure 4:
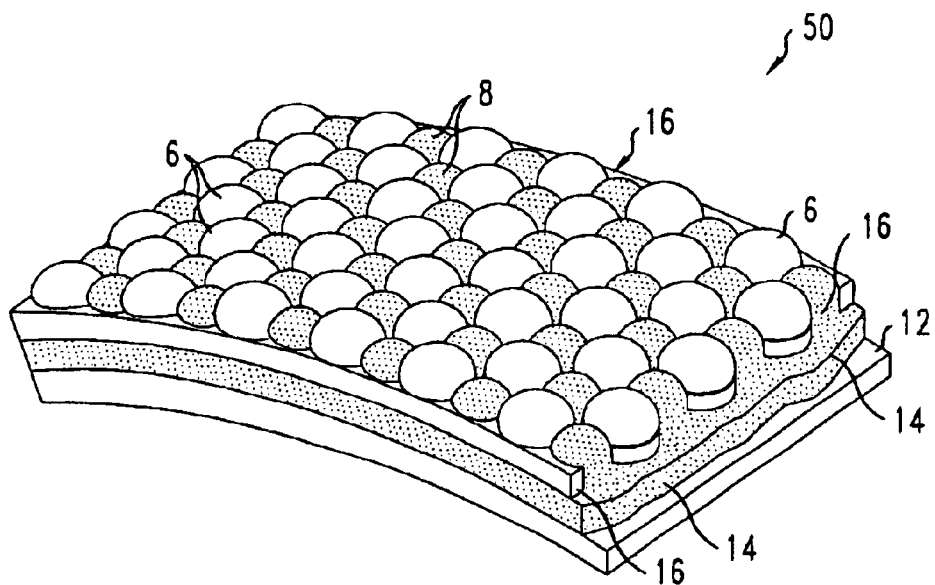
FIG. 4 is an oblique view of the lens array of FIG. 3.

FIGS. 3 and 4 show a lens array 50 with tunable liquid optical apertures. The tunable lens array 50 includes a flexible polymeric housing 4, a cover layer 5, refractive optical micro-lenses 6, a single extended body 8 of light-absorbing liquid, a confining liquid 10, and electro-wetting devices 12 for controlling the position of liquid body 8. The flexible housing 4 includes an array of cylindrical pedestals 14, an associated array of refractive optical micro-lenses 6, and connected channels 16, 18. Elements of lens array 50 function similarly to elements with the same reference numbers in tunable lens 2 of FIGS. 1A–1C. In the lens array 50, the electro-wetting devices 12 for controlling the position of liquid body 8 cause the liquid apertures of the array 50 of refractive optical lenses 6 to operate together, i.e., to open and close as a group rather than individually on a lens-by-lens basis.

The lens array 50 can be fabricated by lamination method. In the lamination method, the housing 4 is made from an etched or molded layer of flexible transparent cross-linked plastic, and then laminated to a flexible transparent cover layer 5. The electrodes 12A and 12B and dielectric layer 12C of the electro-wetting devices 12 are embedding in the plastic layer of the housing 4.

One skilled in the art will recognize that there are many other methods for making the structure for the lens array 50. Exemplary methods include silicon micro-fabrication using reactive ion etching and the LIGA method of electroplating.

As shown in FIG. 3, some embodiments of lens array 50 include a curved polymeric housing 4. A curved housing 4 causes different refractive optical lenses 6 to have optical axes directed in different directions. Such an arrangement enables some lenses 6 to provide frontal vision and other lenses 6 to provide peripheral vision.

Figure 5A:
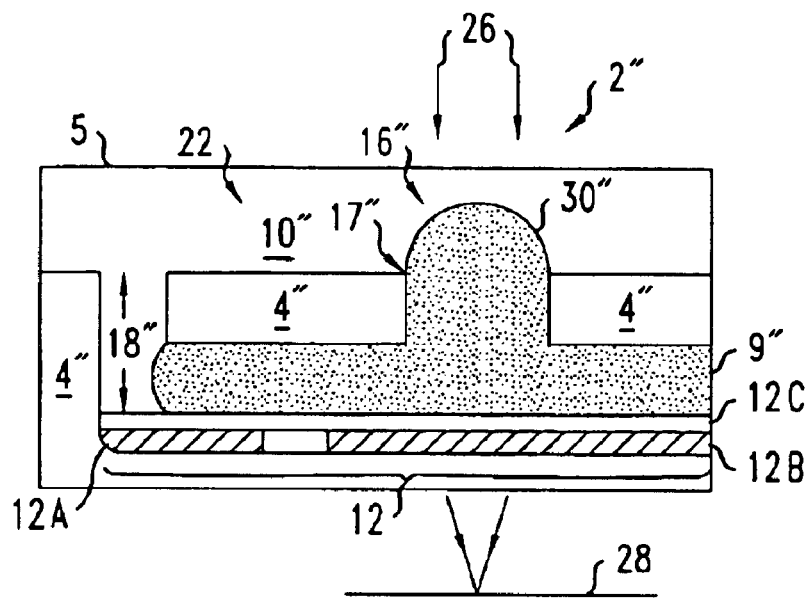
FIGS. 5A and 5B are cross-sectional views of a tunable optical lens that is formed by a portion of a liquid body that protrudes from or protrudes into a channel.
Figure 5B:
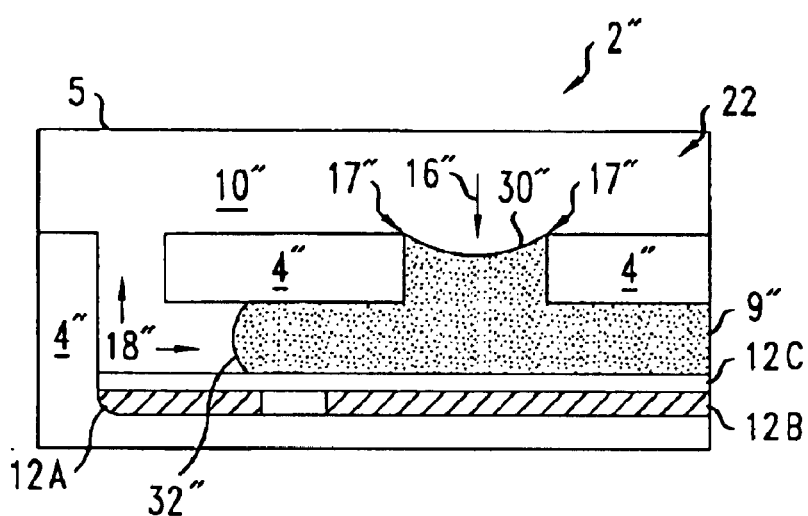

FIGS. 5A and 5B illustrate a tunable optical lens 2" that is based on a liquid lens. The optical lens 2" includes a housing 4", a cover layer 5, an extended body 9" of transparent liquid, a confining liquid 10, and a device 12 for controlling the position of liquid body 9".

The housing 4" is a rigid or semi-rigid structure that includes connected first and second channels 16", 18". The first channel 16" has circularly cylindrical cross section and a mouth 17" with a sharp edge. The second channel 18" forms a pathway between an end of the first channel 16" located opposite the mouth 17" and a cavity 22 located above the mouth 17". The pathway enables a liquid to move in the two channels 16", 18". The housing 4" is formed of any of the transparent materials used for housing 4 of FIGS. 1A–1C. The housing 4" has the same hydrophobic surfaces and fluorinated surface coatings as the housing 4 of FIGS. 1A–1C.

The cover layer 5 closes cavity 22 to produce, i.e., together with the housing 4", a closed structure in which liquids can move and from which liquids will not evaporate.

The liquid of body 9" has similar properties to the liquid of body 8 of FIGS. 1A–1C. In particular, the liquid of the body 9" has a high surface tension, a high CA with surfaces of channels 16", 18", and a low CAH. The liquid of the body 9" is also electrically conductive. The properties of this liquid and the hydrophobic nature of the surfaces of channels 16" and 18" provide to the body 9" a high mobility. Nevertheless, one meniscus 30" of the body 9" is pinned by the sharp edge at the mouth 17" of the first channel 16".

In contrast to the light-absorbing property of the liquid in body 8 of FIGS. 1A–1C, the liquid of the body 9" is transparent at wavelengths where the tunable lens 2" will operate, e.g., visible and/or near-infrared wavelengths. Exemplary liquids for body 9" include aqueous salt solutions and molten salts, wherein both liquids lack dissolved pigments.

The confining liquids 10" and 10 of FIGS. 1A–1C and 5A–5B also have similar properties. The confining liquid 10" is transparent and immiscible with the liquid of body 9". The immiscibility insures that permanent interfaces 30", 32" separate the two liquids. The confining liquid 10" and the liquid of the body 9" also have matched densities so that inertial shocks and re-orientations of the housing 4" will not displace the liquid body 9". Finally, the confining liquid 10" has a low surface energy, which enables this liquid 10" to lubricate surfaces of channels 16" and 18". Exemplary confining liquids 10" include silicone oils.

The confining liquid 10" has a different refractive index than the liquid of the body 9". Due to this difference in refractive indexes, the curved surface of meniscus 30" of body 9" refracts incident light rays 26 even though the meniscus 30" is in contact with the confining liquid 10".

After crossing the meniscus 30", the refracted light rays 26 are transmitted through the body 9" and housing 4" without significant further refraction. The refractive indexes of the two liquids are typically selected so that the refracted light rays will form images on an image detector 28 located outside of the liquids and the housing 4".

The device 12 for controlling the position of liquid body 9" produces an electro-wetting force for holding or displacing the second meniscus 32" of the body 9". The device 12 was described with respect to above FIGS. 1A–1C. To aid in generating an electro-wetting force, the liquid of body 9" is selected to be conductive, e.g., an above-described aqueous salt solution or a molten salt.

In other embodiments, the device 12 for controlling the position of liquid body 9" is a mechanical pump (not shown) rather than a device that produces an electro-wetting force. The mechanical pump applies a pressure to the liquid in channel 18". The applied pressure is able to hold or displace the body 9".

The first meniscus 30" of extended body 9" forms a refractive optical lens with a tunable focal length. In particular, displacing the liquid body 9" changes the focal length of the liquid lens formed by the first meniscus 30", because displacing the liquid body 9" changes the amount that the liquid bulges out of or into mouth 17". Changing the amount of liquid bulging into or out of the mouth 17" changes the radius of curvature of the meniscus 30", which in turn changes the focal length of the liquid lens formed by the meniscus 30". A sufficient displacement of the body 9" can even change a convex liquid lens into a concave lens as is easily seen by comparing FIGS. 5A and 5B.

The device 12 is able to displace the liquid body 9" thereby tuning the focal length of the liquid optical lens formed that is formed by meniscus 30". In particular, the device 12 is capable of applying electro-wetting forces of various sizes to the second meniscus 32", and these electro-wetting forces can displace the whole liquid body 9" thereby changing the amount that the first meniscus 30" protrudes from or into the mouth 17" of channel 16". Such displacements must, of course, be kept small enough to not cause the first meniscus 30" to detach from the mouth 17".

FIG. 6 illustrates a method 42 for tuning the focal length of a liquid lens, e.g., the lens formed by meniscus 30" in FIGS. 5A–5B. The method 42 includes deciding whether a meniscus of a liquid body forms a refractive optical lens with an appropriate focal length (step 44). The deciding step may include measuring the distance to a distant object to be imaged by the meniscus and then, using the measured distance to calculate whether the meniscus will form a clear image of the object. The deciding step may instead include directly imaging the distant object with the meniscus and then, determining whether the resulting image is clear or fuzzy. In response to deciding that the focal length is inappropriate, the method 42 includes displacing part of the liquid body more into or more out of a mouth of the channel that pins the meniscus so that the curvature of the meniscus changes (step 44). The displacement is selected to change the curvature of the meniscus in a manner that produces a more appropriate focal length. For example, if the liquid body protrudes from the mouth and the meniscus has a too high curvature, the displacement should cause less liquid to protrude from the mouth. Similarly, if the liquid body protrudes from the channel and meniscus has too a low curvature, the displacement should cause more liquid to protrude from the mouth.

Figure 8:
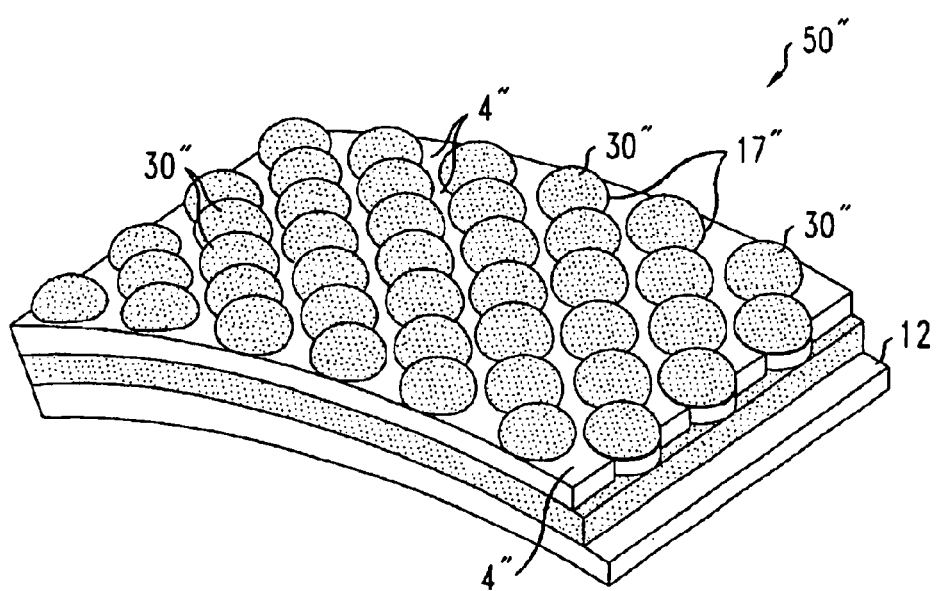
FIG. 8 is an oblique view of a portion of the lens array of FIG. 7.

Lens arrays can incorporate the tunable liquid lens 2" of FIGS. 5A and 5B. In particular, FIGS. 7 and 8 show an exemplary array 50" of liquid lenses with tunable focal lengths. The lens array 50" includes an array-type housing 4", a cover layer 5, an extended body 9"of transparent liquid, a confining liquid 10, and electro-wetting devices 12 for controlling the position of liquid body 9". The housing 4" includes an array of connected channels 16", 18". The channels 16" have associated mouths 17" with sharp edges. The mouths 17" pin an array of menisci 30" of the single extended body 9" of transparent liquid thereby forming an array of liquid refractive optical micro-lenses. Elements of the lens array 50" function similarly to elements with the same reference numbers in FIGS. 5A and 5B. In lens array 50", the electro-wetting devices for controlling liquid body position 12 tune focal lengths of the liquid refractive optical lenses together, i.e., as a group rather than individually on a lens-by-lens basis.

The lens array 50" can be fabricated by a lamination process as illustrated in FIG. 8. Such a process includes etching or molding housing 4" of a transparent flexible plastic and then, laminating the housing 4" to a transparent and flexible cover layer 5. The electro-wetting devices for controlling liquid body position 12 are embedding in the housing 4".

One skilled in the art will also readily recognize that other methods for making the structure for the lens array 50" include silicon micro-fabrication using reactive ion etching and the LIGA method of electroplating.

Some embodiments of lens array 50" have a global curvature that orients the optical axes of different ones of the liquid micro-lenses in different directions. In such arrays, some liquid micro-lenses provide forward vision and other liquid micro-lenses provide peripheral vision.

The invention is intended to include other embodiments that would be obvious to one of skill in the art in light of the description, figures, and claims.

What we claim is:

1. An apparatus comprising:
   a solid refractive optical lens;
   a channel located adjacent to the solid refractive optical lens; and
   an extended body of liquid, a portion of the body forming at least part of an optical aperture stop of the lens, the portion forming a meniscus that protrudes from or into the channel, the liquid being light-absorbing in the visual or near-infrared spectrum.

2. The apparatus of claim 1, wherein the liquid is opaque at visible wavelengths.

3. The apparatus of claim 2, wherein the channel is configured such that the body of liquid is capable of moving in a manner that varies the size of an optical aperture of the lens.

4. The apparatus of claim 3, further comprising:
   one or more electrodes positioned to apply an electro-wetting force to another meniscus of the body, the force capable of moving the body in a manner that varies the size of the aperture stop.

5. The apparatus of claim 1, wherein the body makes a contact angle of at least 90 degrees with a surface of the channel.

6. The apparatus of claim 1, further comprising a second liquid having an interface with the portion of the body protruding from or into the channel, the second liquid having a different refractive index than the lens.

7. The apparatus of claim 1, further comprising:
   another solid refractive optical lens;
   another channel located adjacent the another solid refractive optical lens; and wherein another portion of the body of liquid forms part of an aperture stop of the another refractive optical lens, the another portion forming another meniscus that protrudes from or into the another channel.

8. The apparatus of claim 7, wherein the another channel is configured such that the body of liquid is capable of moving in a manner that varies the size of the aperture stop of the another lens.

9. The apparatus of claim 8, comprising:
one or more electrodes positioned to apply an electra-wetting force to a third meniscus of the body, the force capable of moving the body in a manner that varies the size of both aperture stops.

10. The apparatus of claim 7, wherein the two refractive optical lenses have optical axes directed in different directions.

11. An apparatus comprising:
a housing having a channel with a mouth;
an extended body of a first liquid located in the housing, a portion of the body having a meniscus that protrudes from or into the mouth, the meniscus being pinned at the mouth;
a second liquid in contact with the meniscus, the first and second liquids being immiscible, having different refractive indexes, and being transparent in a portion of the visual spectrum; and
a device capable of displacing the body.

12. The apparatus of claim 11, wherein the device comprises one or more electrodes configured to apply an electro-wetting force to a second meniscus of the body.

13. The apparatus of claim 12, wherein the second meniscus makes a contact angle of at least 90 degrees with a surface of the channel.

14. The apparatus of claim 11, wherein the meniscus is capable of refracting light received from an object that is located outside the liquids such that the refracted light forms an image of the object at a location outside of the liquids.

15. The apparatus of claim 11, further comprising:
another channel having a circular mouth, the another channel being attached to the housing;
wherein another portion of the body has another meniscus that protrudes from or into the circular mouth and is pinned to the circular mouth; and
wherein the second liquid is in contact with the another meniscus.

16. The apparatus of claim 11, wherein the device is capable of displacing the body in a manner that changes curvatures of the menisci at both mouths.

17. The apparatus of claim 15, wherein the two menisci are pinned to the two mouths to form refractive optical lenses whose associated optical axes are directed in different directions.

18. A method for tuning an optical lens, comprising:
deciding whether a characteristic of a lens has an appropriate value, the characteristic being one of a focal length of the lens and a size of an optical aperture of the lens;
deforming a meniscus of a liquid body to compensate the characteristic in response to deciding that the characteristic has an inappropriate value; and
wherein the meniscus bulges from or into a channel; and
wherein the meniscus is pinned at the edge of the mouth or a portion of the liquid body adjacent the meniscus forms a portion of an aperture stop for the lens.

19. The method of claim 18, wherein the displacing further comprises applying an electro-wetting force to another meniscus of the liquid body.

20. The method of claim 18, wherein a portion of the liquid body forms at least part of an optical aperture stop of the lens.

* * * * *